US007411183B2

(12) United States Patent
Overney et al.

(10) Patent No.: US 7,411,183 B2
(45) **Date of Patent: *Aug. 12, 2008**

(54) USER CUSTOMIZABLE PLATE HANDLING FOR MALDI MASS SPECTROMETRY

(75) Inventors: Gregor T. Overney, Sunnyvale, CA (US); Bryan D. Miller, Cupertino, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 11/063,486

(22) Filed: Feb. 22, 2005

(65) Prior Publication Data

US 2005/0139779 A1 Jun. 30, 2005

Related U.S. Application Data

(63) Continuation of application No. 10/429,234, filed on May 2, 2003, now Pat. No. 7,138,625.

(51) Int. Cl.
*H01J 49/04* (2006.01)
*B01D 59/44* (2006.01)

(52) U.S. Cl. ...................................... 250/282; 250/288

(58) Field of Classification Search ................ 250/287, 250/286

See application file for complete search history.

(56) References Cited

U.S. PATENT DOCUMENTS

| | | | |
|---|---|---|---|
| 5,498,545 | A | 3/1996 | Vestal |
| 5,595,636 | A | 1/1997 | Franzen |
| 5,808,300 | A | 9/1998 | Caprioli |
| 5,821,063 | A | 10/1998 | Patterson et al. |
| 5,827,659 | A | 10/1998 | Patterson |
| 5,840,256 | A | 11/1998 | Demers et al. |
| 5,861,623 | A | 1/1999 | Park |
| 5,869,240 | A | 2/1999 | Patterson |
| 5,969,350 | A | 10/1999 | Kerley et al. |
| 6,027,942 | A | 2/2000 | Hutchens et al. |
| 6,221,626 | B1 | 4/2001 | Bienvenut et al. |
| 6,288,390 | B1 | 9/2001 | Siuzdak et al. |
| RE37,485 | E | 12/2001 | Vestal |
| 6,353,423 | B1 | 3/2002 | Kang et al. |
| 6,448,065 | B2 | 9/2002 | Laugharn, Jr. et al. |
| 6,508,986 | B1 | 1/2003 | Anderson et al. |

(Continued)

OTHER PUBLICATIONS http://www.srsmaldi.com/Profler/Prof_Soft.html. Profiler Software; Dr. Palton, Jun. 16, 2003.

*Primary Examiner*—David A. Vanore
*Assistant Examiner*—Robert Kim

(57) ABSTRACT

Methods for specifying the layout of a MALDI sample plate are provided. In general, the methods involve creating a file containing sample plate layout parameters that describe the layout of a MALDI sample plate, and storing the file on a computer readable medium prior to placement of the MALDI sample plate into a MALDI ion source. In many embodiments, the file includes information about the size or shape of the sample plate, or information about the size, shape or position of a sample on the sample plate. In many embodiments, a MALDI sample plate is placed in a MALDI ion source and a stored layout file for the sample plate is accessed and used to position an area of the sample plate in a laser beam. The subject methods, kits and apparatus find use in a variety of different mass spectrometry applications.

17 Claims, 5 Drawing Sheets

U.S. PATENT DOCUMENTS

| | | | |
|---|---|---|---|
| 6,617,575 | B1 | 9/2003 | Cramer |
| 6,673,315 | B2 * | 1/2004 | Sheridan et al. ............... 422/50 |
| 6,707,037 | B2 | 3/2004 | Whitehouse |
| 6,804,410 | B2 * | 10/2004 | Lennon et al. .............. 382/274 |
| 2002/0011561 | A1 | 1/2002 | Park et al. |
| 2002/0011562 | A1 | 1/2002 | Park |
| 2002/0074517 | A1 | 6/2002 | Krutchinsky et al. |
| 2002/0094533 | A1 | 7/2002 | Hess et al. |
| 2002/0123153 | A1 | 9/2002 | Moon et al. |
| 2002/0158027 | A1 | 10/2002 | Moon et al. |
| 2002/0191864 | A1 | 12/2002 | Lennon et al. |
| 2003/0104378 | A1 | 6/2003 | Allawai et al. |

* cited by examiner

FIG. 3A
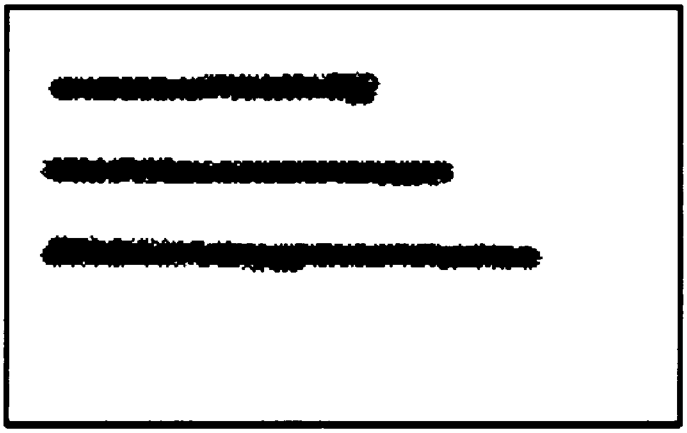
FIG. 3B
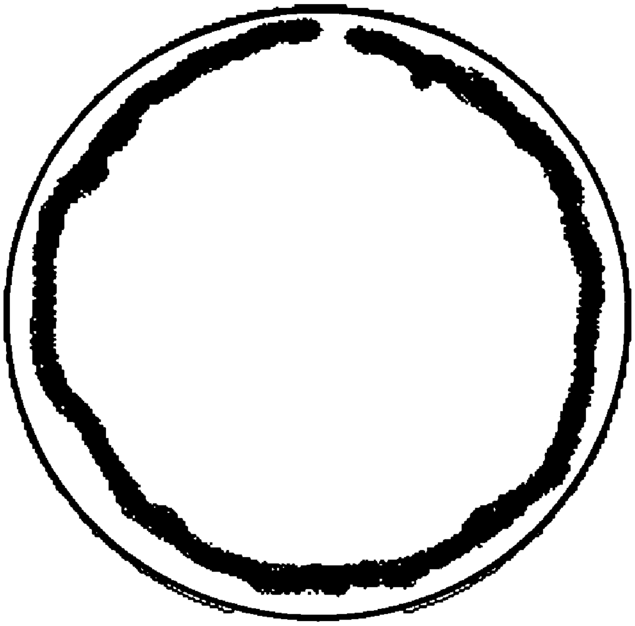
FIGS. 3A and 3B

FIG. 4A
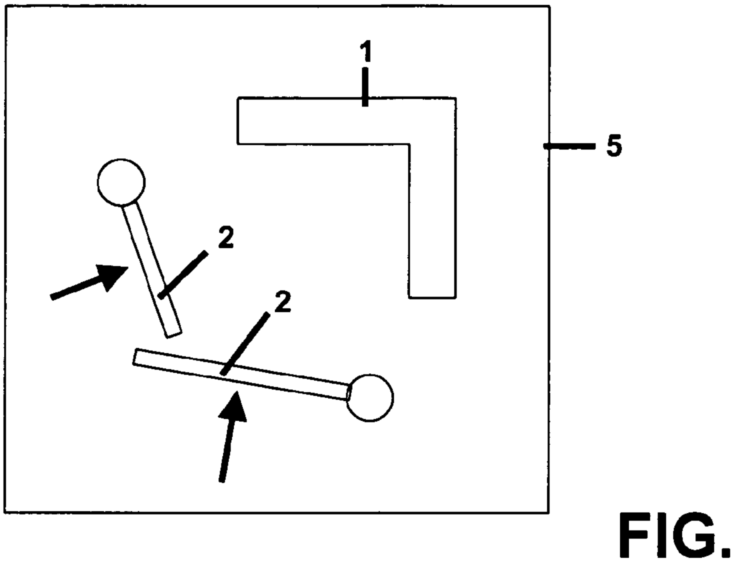
FIG. 4B
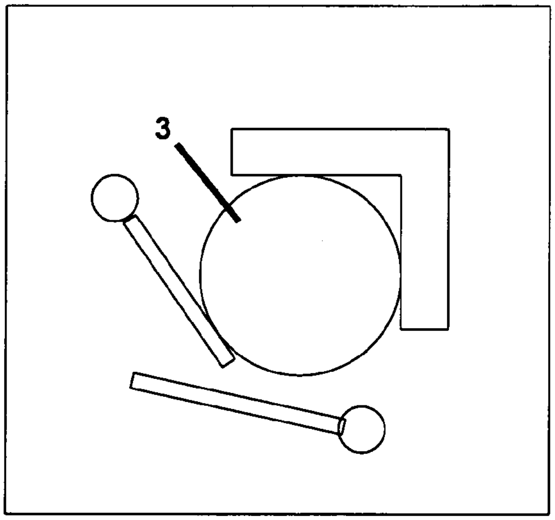
FIG. 4C
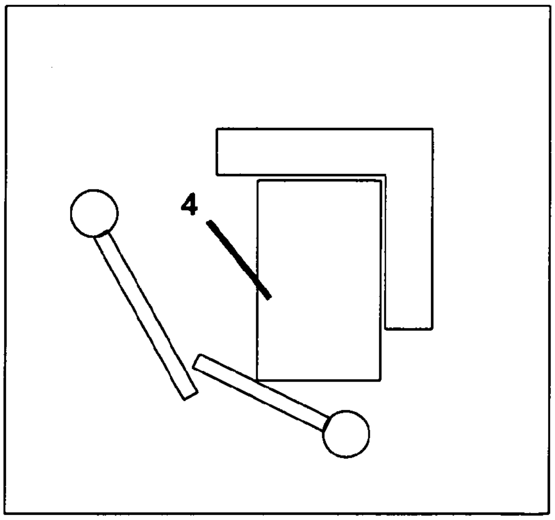
FIGS. 4A-4C

USER CUSTOMIZABLE PLATE HANDLING FOR MALDI MASS SPECTROMETRY

FIELD OF THE INVENTION

This invention relates generally to methods and systems for performing MALDI mass spectrometry.

BACKGROUND OF THE INVENTION

During the past decade, matrix-assisted laser desorption/ionization (MALDI) has proven to be a valuable tool in the analysis of a variety of molecules, e.g., biomolecules such as proteins and other organic molecules, and has application in a wide variety of fields such as genomics and proteomics. In many cases, MALDI ion sources are integrated with an analytical device, e.g., a mass spectrometer, for studying the MALDI ionized analyte. Mass spectrometers are instruments that measure and analyze ions by their mass and charge. For the most part, time-of-flight mass spectrometers ("TOF-MS") are used for this purpose, but other mass spectrometers may be used as well, such as an ion cyclotron resonance spectrometer (e.g., a Fourier transform ion cyclotron mass resonance spectrometer), ion trap mass spectrometers (e.g., a high-frequency quadrupole ion trap mass spectrometer), and hybrid instruments (e.g., a quadrupole/time-of-flight mass spectrometer, QqTOF).

Generally, MALDI ion sources vaporize and ionize non-volatile biological analytes from a solid phase directly into a gaseous phase. To accomplish this, analytes are suspended or dissolved in a matrix of generally a small organic compound which co-crystallizes with the analyte. A sample containing the analyte/matrix mixture is applied to a suitable support, e.g., a sample plate, which is then loaded into an ion source for performing MALDI. It is thought that the presence of the matrix enables the analyte to be ionized without being degraded, solving a problem of other methods. Accordingly, MALDI enables the detection of intact molecules as large as 1,000 kDaltons, and is particularly suitable for the analysis of biological samples such as proteins, peptides, and nucleic acids, which may range in size from 1 kDa to about 1000 kDa.

A laser beam serves as the desorption and ionization source in MALDI. Once a sample is loaded into the MALDI ion source, a laser is used to vaporize the analyte. In the vaporization process, the matrix in the sample absorbs some of the laser light energy causing part of the illuminated matrix to vaporize. The resultant vapor cloud of matrix carries some of the analyte with it so that the analyte may be analyzed. The matrix molecules absorb most of the incident laser energy, thus minimizing analyte damage and ion fragmentation. Samples may be ionized by a MALDI ion source at atmospheric pressure (AP) or in a vacuum.

Once the molecules of the analyte are vaporized and ionized, they are usually analyzed. As mentioned above, this may be accomplished by the use of a mass spectrometer. Accordingly, the vaporized ions are transferred electrostatically and/or pneumatically into a mass analyzer, for example a TOF-MS flight tube, where they are separated. Following separation of the ions, they are then directed to a detector so that the ions are individually detected. Depending on the nature of the analyzer and how it separates the ions, mass spectrometers fall into different categories. In the case of a TOF-MS for example, separation and detection is based on the mass-to-charge (m/z) ratios of the ions. In TOF-MS, detection of the ions at the end of the time-of-flight tube is based on their flight times, which are proportional to the square root of their m/z.

As such, in general, MALDI involves the generation of ions from analytes in a sample, first by embedding the analytes into a matrix to form crystals and then irradiating the analytes with a laser beam, usually a UV light beam, generated by a suitable laser.

In response to the ever increasing interest in the application of MALDI to a wide range of analytical problems, MALDI sample plate formats, including the size and geometry of the plates themselves and the sizes, geometries and positioning of spots within the plates, are ever-changing. For example, in order to increase detection limits, the concentration of a given analyte in a sample may be increased by decreasing the volume of a sample. Spotting samples of smaller volumes onto a MALDI sample plate leads to a sample plate with smaller spots. Also, as more and more samples are analyzed, samples are spotted onto sample plates at higher densities. In fact, in many MALDI methods, a sample plate must be in a high vacuum before ionization is performed. Since a high vacuum takes a significant amount of time to establish in a MALDI ion source, the throughput of such a MALDI ion source is typically proportional to the density of samples spotted on a sample plate. Also, in addition to the ever-changing densities and sizes of spots on a sample plate, sample plates are variable in their size and geometries, and individual samples may vary in their size, shape and position on a single sample plate.

Current MALDI ion sources typically accommodate little variability of sample plate format, and are usually pre-set to ionize samples from a single MALDI plate type, e.g. a single sample plate, a 24-sample plate, or a 96-sample plate.

Accordingly, a need exists for MALDI sources and methods that accommodate sample plates of different sizes and geometries, and samples of variable sizes, shapes and positions on a sample plate. Of particular interest are methods and apparatus that allow a user to configure a MALDI ion source to ionize a sample at a particular position on a sample plate. The present invention meets this, and other, needs.

RELEVANT LITERATURE

United States patents of interest include: U.S. Pat. Nos. RE37,485; 5,498,545; 6,027,942; 5,861,623; 5,821,063; 5,808,300; 5,969,350; 6,488,065; 6,353,423; 6,221,626; 5,827,659 and 5,860,240; published U.S. Patent application of interests include: 20020094533; 20020011562; 20020123153; 20020011561 and 20020158027; other literature of interest includes: the product literature of the Profiler mass spectrometer found at the world wide website of SRSmaldi.com at srsmaldi.com/Profiler/Prof_Soft.

SUMMARY OF THE INVENTION

Methods for specifying the layout of a MALDI sample plate are provided. In general, the methods involve creating a file containing sample plate layout parameters that describe the layout of a MALDI sample plate, and storing the file on a computer readable medium prior to placement of the MALDI sample plate into a MALDI ion source. In many embodiments, the file includes information about the size or shape of the sample plate, or information about the size, shape or position of a sample on the sample plate. In many embodiments, a MALDI sample plate is placed in a MALDI ion source and a stored layout file for the sample plate is accessed and used to position an area of the sample plate in the laser beam. The subject methods and apparatus find use in a variety of different mass spectrometry applications.

BRIEF DESCRIPTION OF THE DRAWINGS

FIGS. 3A and 3B schematically illustrate two exemplary sample plates, one rectangular (FIG. 3A) and one circular (FIG. 3B), containing types of linearly extended sample.

FIGS. 4A, 4B and 4C show exemplary embodiments of a sample clip for use with a sample holder in a subject MALDI ion source.

DEFINITIONS

Figure 1:
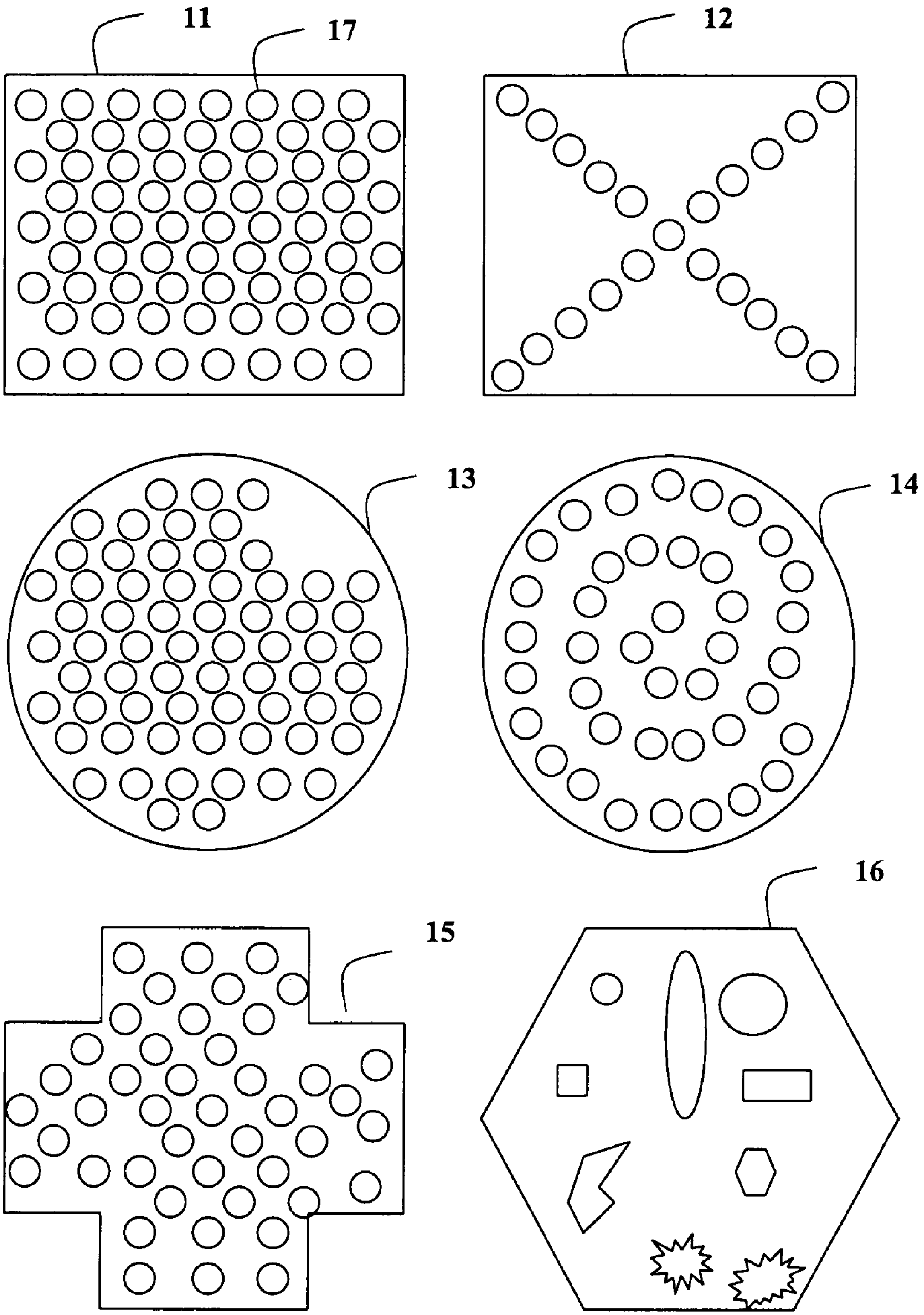
FIG. 1 schematically illustrates exemplary MALDI sample plates for which sample plate layout parameter files may be made using the subject methods.

Unless defined otherwise, all technical and scientific terms used herein have the same meaning as commonly understood by one of ordinary skill in the art to which this invention belongs. Still, certain elements are defined below for the sake of clarity and ease of reference.

The term "computer readable medium" as used herein refers to any storage or transmission medium that participates in providing instructions and/or data to a computer for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external to the computer. A file containing information may be "stored" on computer readable medium, where "storing" means recording information such that it is accessible and retrievable at a later date by a computer.

With respect to computer readable media, "permanent memory" refers to memory that is permanent. Permanent memory is not erased by termination of the electrical supply to a computer or processor. Computer hard-drive ROM (i.e. ROM not used as virtual memory), CD-ROM, floppy disk and DVD are all examples of permanent memory. Random Access Memory (RAM) is an example of non-permanent memory. A file in permanent memory may be editable and re-writable.

In certain embodiments of the invention, stored files may be created or edited by "entering text". Text may be entered using any known method, including typing text (e.g., using a keyboard or mouse or copy and pasting) into a user interface displaying a file, typing text directly into a file, or importing text from a spreadsheet, etc.

Subject computer readable media may be at a "remote location", where "remote location," means a location other than the location at which the MALDI ionization and detection apparatus. For example, a remote location could be another location (e.g., office, lab, etc.) in the same city, another location in a different city, another location in a different state, another location in a different country, etc. As such, when one item is indicated as being "remote" from another, what is meant is that the two items may be in the same room but separated, or at least in different rooms or different buildings, and may be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the Internet or Intranets including email transmissions and information recorded on websites and the like.

The term "using" is used herein as it is conventionally used, and, as such, means employing, e.g. putting into service, a method or composition to attain an end. For example, if a program is used to create a file, a program is executed to make a file, the file usually being the output of the program. In another example, if a sample plate layout file is used, it is usually accessed, read, and the information stored in the file employed to attain an end. Similarly if a unique identifier, e.g. a barcode is used, the unique identifier is usually read to identify, for example, an object or file associated with the unique identifier.

A unique identifier is a unique code (e.g. a number) that is "associated" with an object or file. If a unique identifier is associated with an object, the object is usually labeled with the unique identifier. For example, the unique identifier may be written on an object, or the unique identifier may be contained on a the surface of a label (e.g., a paper or plastic label) which is adhered to the object. In certain embodiments, the unique identifier is a barcode, and the barcode, as is known in the art, is usually present on the surface of a label that is adhered to the object. As is known in the art, there are several ways of associating a file with a unique identifier. For example, the file may be named with the unique identifier, the file may contain the unique identifier embedded in the file, e.g., as a file header, or the file may have a file path that is unique to the file, and the file path uniquely indicates the file.

The term "sample" refers to a sample derived from a variety of sources such as from foodstuffs, environmental materials, a biological sample or solid, such as tissue or fluid isolated from an individual organism, including, but not limited to, for example, plasma, serum, spinal fluid, semen, lymph fluid, the external sections of the skin, respiratory, intestinal, and genitourinary tracts, tears, saliva, milk, blood cells, tumors, organs, and also samples of in vitro cell culture constituents (including, but not limited to, conditioned medium resulting from the growth of cells in cell culture medium, putatively virally infected cells, recombinant cells, and cell components). A sample may contain proteins, peptides, lipids, nucleic acids, carbohydrates, or other organic or inorganic molecules, such as other biopolymers or polymers. In many embodiments, sample is complexed with a matrix suitable for MALDI. Samples at concentrations of 10 fM or more are considered concentration samples, whereas samples at concentrations of less than 10 fM (e.g. less than about 1 fM, less than about 0.1 fM, less than about 10 aM or less than about 1 aM) are considered low concentration samples.

A sample on a sample plate exists within a sample perimeter, where the sample perimeter delineates the edge of the sample on a sample plate. At certain positions within sample perimeter, crystals containing a mixture of sample and matrix suitable for MALDI are formed.

The term "analyte" refers to a known or unknown molecule in a sample, which will be ionized by a MALDI ion source. In general, the target molecule may be a biopolymer, i.e., an oligomer or polymer such as an oligonucleotide, a peptide, a polypeptide, a protein, and antibody, or the like.

A "sample plate" is a plate of samples suitable for use with a MALDI ion source. In most embodiments, a sample plate is loaded into a MALDI ion source for ionization of the samples. A sample plate can be of any shape, e.g., circular, square, rectangular, oval, etc.

A sample at an "arbitrary position" on a sample plate is a sample that is at any position on the sample plate. Samples that are at arbitrary positions on a sample plate may be non-consecutive samples, and they may not be arranged in any order or shape. Samples that are ionized using the subject methods may be ionized arbitrarily in that the samples are ionized is not in any particular order. In other words, samples that are ionized using the subject methods may be arbitrarily chosen.

A "sample plate layout parameter" describes the configuration of a plate in terms of the size or shape of the plate, or the size, shape and positioning of at least one sample on the plate. In general, two types of sample plate parameters exist: sample plate geometry parameters (i.e. the size or shape of a sample plate) or sample feature parameters (i.e. the size, shape or position of a feature, e.g., a sample spot on the sample plate).

A "sample plate geometry parameter" may indicate the shape of the sample plate, e.g. circular, square, rectangular, oval, shapes, etc., and may indicate the dimensions of the shape using any convenient measurement units (m, motor step units, etc.). A sample plate geometry may be parameterized mathematically, e.g. using a formula that describes the size and shape of a plate.

A "sample feature parameter" may indicate the shape of a sample, e.g. circular, square, rectangular, oval, elongated circle, etc., may indicate the dimensions of the shape using any convenient measurement units (m, motor step units, etc.), and may indicate the position of the sample on the sample plate (for example as a vector in relation to a defined position on a sample plate). A sample feature may also be parameterized mathematically, e.g. using a formula that describes the size, shape or position of a sample on a plate. As such, sample feature parameters may be used to indicate information about samples that are complex in shape, such as an elongated sample (e.g., an elongated shape formed by the continuous deposit of a liquid sample on a moving substrate).

The term "ion" is used in its conventional sense to refer to a charged atom or molecule, i.e., an atom or molecule that contains an unequal number of protons and electrons. Positive ions contain more protons than electrons, and negative ions contain more electrons than protons. An ion of the present invention can be singly charged, or it may have a multiple charge.

The term "detector" refers to any device, apparatus, machine, component or system that can detect an ion. Detectors may or may not include hardware and software.

A "MALDI ion source" is part of a MALDI system and contains a sample plate holder and laser. In certain embodiments, a MALDI ion source includes a chamber in which a MALDI sample plate is illuminated with a laser beam in order to effect ionization of a sample on the sample plate. A chamber, if present, may be at atmospheric pressure or at vacuum. A MALDI ion source may also include robotic equipment and a processor for plate handling, sample plate holder positioning, laser control and optical adjustments. Ionization of a sample occurs in a MALDI ion source. Atmospheric (AP) and vacuum MALDI ion sources are types of MALDI ion sources.

A "MALDI system" contains a MALDI ion source integrated with an ion detection and measurement system such as a mass spectrometer, and, usually, a data processing system. If a mass spectrometer is present, the system usually includes a vacuum system. MALDI ion source control may be performed with the data processing and control system of the mass spectrometer, or processors that are separate but linked in communication.

A "laser beam" refers to focused radiation that may be ultraviolet, visible, or infrared light. If an object is "in the path" of a laser beam or "in a laser beam", it is at a position that is illuminated by the radiation when the radiation is present. If an object is in the intended path of a laser beam, it is also "in the path" of the laser beam.

When a first object is moved "relative to" a second item, or the "relative position" of two items is adjusted, the first object may be moved in related to a second object in a fixed position or the second object may be moved in relation to the object item in a fixed position. Alternatively, a first object may be moved "relative to" a second object by moving both objects. For example, an area on a sample plate may be moved relative to the laser beam by adjusting the path of the laser beam, by moving the sample plate, or by moving both the laser beam and the sample plate.

A "reference point" of an object is a position of a part of the object (e.g. a MALDI ion source, a MALDI sample plate, etc.) relative to which other positions or distances the object can be measured. In certain embodiments, an object has a single fixed reference point. Any position within an object may be used as a reference point.

DETAILED DESCRIPTION OF THE INVENTION

Methods for specifying the layout of a MALDI sample plate are provided. In general, the methods involve creating a file containing sample plate layout parameters that describe the layout of a MALDI sample plate, and storing the file on a computer readable medium prior to placement of the MALDI sample plate into a MALDI ion source. In many embodiments, the file includes information about the size or shape of the sample plate, or information about the size, shape or position of a sample on the sample plate. In many embodiments, a MALDI sample plate is placed in a MALDI ion source and a stored layout file for the sample plate is accessed and used to position an area of the sample plate in a laser beam. The subject methods and apparatus find use in a variety of different mass spectrometry applications.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

In further describing the invention in greater detail than provided in the Summary and as informed by the Background and Definitions provided above, process or program aspects of the invention are first described. This discussion is followed by a description of suitable hardware for use in the invention and potential use in molecular mass spectrometry.

Methodology/Programming

The subject invention provides methods for specifying the layout of a MALDI sample plate. In general, the methods involve creating and storing a file containing layout parameters for a sample plate on a computer readable medium prior to placement of the sample plate in a MALDI ion source. More specifically, the subject invention provides a file of layout parameters for a sample plate, such as the geometry of a sample plate, or the size, shape and positions of samples on the sample plates, that is created and stored prior to placement of the corresponding sample plate in a MALDI ion source. Once a sample plate is placed in a MALDI ion source, a stored corresponding layout file is accessed for the sample plate, and a laser beam is positioned with respect to an area (e.g. a sample) on the sample plate using the parameters provided in the layout file. Positioning the laser beam with respect to the sample plate may be accomplished by any means, for example by moving the sample plate in relation to a laser beam at a fixed position, moving a laser beam in relation to a sample plate at a fixed position (e.g., by using mirrors, lenses, etc), or by moving the sample plate and the laser beam such that a particular area of the sample plate is positioned in the laser beam. In certain embodiments, once positioned, a laser beam may be fired at a sample to effect ionization of the sample. These above described methods may be used in combination with other methods to direct a laser beam to a particular position within a sample for ionization.

The subject methods therefore find use in specifying the layout of a MALDI sample plate prior to analysis of samples on the plate in a MALDI system, and allow the use of sample plates with a variety different layouts on a single MALDI system. In certain embodiments, the subject methods may be used to position a laser beam with respect to samples at any arbitrary positions on the sample plate. In certain embodiments, the sample plate layout file is chosen from a database of sample plate layout files, and in some embodiments this selection is performed automatically using a unique identifier, such as a barcode, associated with a sample plate.

As such, in many embodiments, the subject methods involve accessing a stored sample plate layout parameter file, positioning a sample plate with respect to a laser beam according to the parameters stored in the file, and ionizing a sample with the laser beam. In certain embodiments, after the sample is ionized, the ions are detected using, for example, a time of flight mass analyzer or another ion detector.

Also provided are methods for automated ionization of samples on a sample plate. After ionization of a first sample on a sample plate using the stored sample plate layout file, a second sample on the sample plate may be ionized using the same sample plate layout file.

In further describing the invention, sample plate layout files are described first, followed by a description of methods for specifying the layout of a sample plate, and a description of representative methods of positioning a laser beam with respect to an area of a sample plate using a stored file of sample plate layout parameters.

Sample Plate Layout Parameter Files

A sample plate layout parameter file contains information regarding the size and/or shape of a sample plate, and/or information about the size, shape and/or position of at least one sample on the sample plate.

In general, the sample plate parameter layout file is created and stored on computer readable media before a sample plate is placed in a MALDI ion source. In one embodiment, the sample plate layout parameters describe sample plate geometry and at least one sample on the plate. A MALDI ion source, upon accessing the parameters, may move a MALDI sample plate relative to a laser beam such that the laser beam, when fired, is directed to an area of interest, e.g., at least a portion of a sample, on the plate.

Sample plate layout parameters for an individual sample plate are usually stored as a file on a computer readable medium. A sample plate layout parameter file may be stored in any convenient format, usually as a text file such as a tab or comma delimited text file, an ASCII file, an extensible markup language (XML) file, or the like, such that it is readable and useable for positioning a sample plate in a MALDI ion source in relation to a laser beam. A sample plate layout parameter file is usually stored in permanent memory such that it is accessible to and may be used by a MALDI system at a later time or date.

The sample plate layout parameter file may be editable, in that it may be accessed from storage, changed, and saved with the changes made, either with the same file name or with a different file name. A sample plate layout parameter file is usually associated with a unique identifier, such as a name or number that distinguishes it from other sample plate layout parameter files. In most embodiments, the unique identifier allows the identification of a corresponding sample plate that is also labeled with a unique identifier, e.g., a barcode.

In many embodiments, the layout file for a particular sample plate may be stored with layout files for a plurality of other sample plates (e.g., at least about 5, at least about 10, at least about 50, at least about 100, at least about 500, at least about 1000 or more up to about 10,000 layout files). As such, a "library" or "database" of sample plate layout parameter files may be created using the subject methods, a particular file of which may be accessed using its unique identifier.

In general, the number of parameters that may be individually specified in a sample plate layout parameter file varies, but is typically at least one, including, but not limited to two, three, four, five, six or more, about 8 or more, about 10 or more, about 15 or more, about 20 or more, about 30 or more, about 50 or more, about 80 or more, about 100 or more, about 200 or more, about 300 or more, about 500 or more, about 800 or more, about 1000 or more, about 5000 or more, usually up to about 10,000 or more, where one parameter is a piece of information about a sample plate layout (e.g., the shape of a sample plate, or a position of a sample on the sample plate, etc.).

Representative parameters include, but are not limited to:

Sample Plate Geometry Parameters

Sample plate geometry parameters include parameters for the size and shape of a sample plate that may contain samples to be ionized. Exemplary sample plate shapes include circular, square, rectangular, polygon shapes, and the like. In many embodiments, the sample plate may be described mathematically, for example by using a mathematical formula that describes shapes (e.g., Ghosh (1988), Comput. Vision, Graphics, Image Process. 44, 239-269). Sample plate size is the size of a MALDI sample plate. In general, the sample plate size parameters are expressed in length measurements, e.g., width A and height B (if the sample plate is rectangular), side length A (if the sample plate is square, or another equilateral shape), diameter or radius A (if the sample plate is circular), or other dimensional length measurements and/or formulae that can describe the size of the sample plate.

Sample Plate Feature Parameters

Sample plate feature parameters include parameters for the size, shape and position of a sample on a sample plate. In the context of this invention, the phrases "sample plate feature parameter" and "sample feature parameter" have the same meaning and are used interchangeably.

A sample position is the position of a sample on a sample plate, usually expressed in length measurements, e.g., vertical distance X and horizontal distance Y from an arbitrary reference position on the sample plate. An arbitrary reference position on the sample plate may be, for example, one corner of a sample plate, or a marked (e.g., notched) position of a sample plate, etc. In general the sample position may be measured in any suitable units of length measurement, for example, cm, mm, or motor step units. In many embodiments, particularly if the sample has a simple shape (e.g., a circle, rectangle, square, etc.) the center of a sample may be used to measure the sample position. In other embodiments, particularly if the sample does not have a simple shape (e.g., is a polygon), the sample position may be measured from a suitable feature of the shape, such as the top of the shape, a suitable corner, or the bottom of the shape.

A sample shape is the shape of a sample on a sample plate. Exemplary sample shapes include circular, square, rectangular, elongated circle, polygon etc, and, other shapes that can be described mathematically (e.g., Ghosh (1988), Comput. Vision, Graphics, Image Process. 44, 239-269). In certain embodiments, the sample shape is defined using a series of positions relative to an arbitrary position on the sample plate. For example, a sample may be defined by the position of its corners, relative to an arbitrary position.

A sample size is the size of a sample on a sample plate. In general, sample size parameters are expressed in length measurements, e.g., width A and height B (if the sample is rectangular), width A (if the sample is square, or another equilateral shape), diameter or radius A (if the sample is circular), or other length measurements and/or formulae that can describe the size of the sample.

For many samples, the size, shape, and position may be described by specifying positional information for certain features of the sample, e.g., corners of the sample, relative to an arbitrary reference position on the sample plate, etc. For example, if the sample is a square, rectangle, pentagon, hexagon, star or any other shape or polygon comprising approximately straight edges and corners, the sample size, shape and position may be described by defining the positions of the corners of the sample shape in relation to an arbitrary reference position on the sample plate. Exemplary sample plates are shown in FIG. 1. Sample plates may be square or rectangular 11, 12, oval or circular 13, 14, or more complicated shaped 15, 16 sample plates. Samples, represented by the smaller shapes 17 within plates 11-16, may be simple circles, or complicated shapes (shown in sample plate 16). The layouts of sample plates containing samples with irregular shapes, such as, e.g., linear or non-linear shapes, such as those described in FIGS. 3A and 3B, may also be specified using the subject methods.

In certain embodiments, a single sample plate may contain samples of differing size or shape, and the samples may occupy arbitrary positions that are not geometrically aligned (e.g., not all in a line or following any pattern). For example, sample plate parameters may indicate that there are a number of, e.g., 1 or more, 2 or more, about 5, about 10 or more, about 20 or more, about 50 or more, about 100 or more, about 500 or more, about 1000 or more, usually up to about 5000 samples of differing size or shape on a sample plate. In certain embodiments, each sample has a different size and/or shape.

In certain embodiments, a sample plate may contain one or more samples having non-geometrical shapes. Exemplary sample plates are shown in FIGS. 3A and 3B, where plates (shown by the rectangle in FIG. 3A and the circle in FIG. 3B) contain linear (FIG. 3A) or curved (FIG. 3B) samples.

Shapes, sizes and positions of objects may generally be described by Kepler software, and, in many embodiments, the objects are described using Cartesian coordinates for identifying specific areas on an image corresponding to the sample plate. X, Y coordinates, measured from a reference point, e.g., a reference point of a sample plate or an ion source, are typically used. In other exemplary embodiments polar coordinates r and θ may be used. Any convenient coordinate system may be used.

For samples that are three dimensional in shape, the sample plate parameter file may also contain parameters relating to the vertical position of a sample above the surface of a sample plate.

Sample plate layout parameter files may also contain information regarding any actual laser shooting pattern that was previously used in sample analysis on the plate (e.g., specific plate geometry coordinates used in laser positioning, number of laser shots/position, approximate diameter of laser image, etc.). This information may be used to, for example, draw a schematic of a laser shooting pattern atop an image of the target in a graphical user interface or to direct laser positioning during sample re-analysis, etc.

Specifying the Layout of a Sample Plate

A file of sample plate layout parameters may be created using a variety of means. Exemplary means include: a) manually entering sample plate layout parameters using a graphical user interface showing a digital image of a sample plate, b) automatically entering sample plate layout parameters by processing of an image of a sample plate using an image processing program, c) manually entering text to create a file de novo, and d) manually or automatically modifying an pre-existing sample plate layout parameter file.

In many embodiments, a sample plate layout parameter file (i.e., a layout file) is created in a remote location to a MALDI ion source (e.g., a separate workstation) and saved onto a computer readable medium that is accessible by the processors of the MALDI ion source. In certain other embodiments, the file is created using a workstation that is part of a MALDI system comprising a MALDI ion source. As noted above, the layout file is usually created and stored on computer readable medium prior to placement of a MALDI sample plate in a MALDI ion source, and, as such, the file may be created immediately prior, or at least about one minute, one hour, one day, one week or even at least one month or at least one year prior to its placement into the MALDI ion source.

In many embodiments, a set of sample plate parameters is specified and the sample plate format parameter set is saved and accessibly stored in a database or library of sample plate format parameter files. A file is usually associated with the sample plate to which it corresponds by means of a unique name, such as a bar-code number, that is associated with the sample plate. As such, layout files for a plurality of samples plates (e.g., at least two plates) may be created and saved before the first plate of the plurality is placed in the MALDI ion source. Sample plate format parameters may be retrieved from the library, converted into an image, and edited if a non-corresponding but similar sample plate is to be ionized.

As mentioned above, sample plate layout may be specified using a number of methods. For example, sample plate parameters may be determined de novo, or sample plate parameters from an previously saved file may be modified and saved as a new file. Exemplary methods for specifying the layout of a MALDI sample plate may be done automatically using image processing and analysis, or may be done manually or semi-manually using a graphical user interface or by a text editor. These methods may be used to modify a previously stored parameter file, create a new parameter file, or confirm that a previously stored parameter file is suitable for use. In some embodiments in which a previously saved file is modified, the saved parameters are converted into an image, the image superimposed onto an image for an uncharacterized sample plate, and the parameters modified using a graphical user interface.

In some embodiments, the layout of a MALDI sample plate is determined using a sample plate layout-providing program. Such a program analyzes a digital image of a sample plate and determines the parameters for the sample plate. In one embodiment, a digital image of a sample plate is made with a camera and optionally saved as, for example, a TIFF, GIF, or JPEG file. The image of the sample plate is then processed to determine its parameters. In one embodiment, the sample plate geometry parameters are determined by processing a digital image of a sample plate that is placed on a light box such that the perimeter of the sample plate can be easily determined. Similarly, sample plate feature parameters may be determined by processing a digital image of a sample plate that is illuminated from the side such that samples are contrasted from the sample plate.

In other embodiments, a set of sample plate parameters is created using a graphical user interface (GUI). The GUI usually provides an image of a sample plate, e.g., a digital representation of a sample plate, or a schematic representation of a sample plate that may be utilized in determining sample plate format parameters. In general, the GUI displays an image of at least a portion of a sample plate, and allows a user to set parameters for the sample plate by selecting areas of the image.

The image shown in a subject GUI is usually that of a sample plate to be ionized. The image may be a digital image of the plate, ideally showing the perimeter of the samples on the plate. In many embodiments, the digital image of the sample plate is obtained from a side-illuminated sample plate in which the areas of sample are visible by virtue of their shadow or opaqueness.

The GUI allows a user to set sample plate parameters by selecting areas or positions on the image of the sample plate. After the areas are selected, the selected areas are converted into sample plate parameters that positionally correspond to the selected areas. In other words, the areas selected through the GUI are converted into sample plate parameters that direct a laser to positions on a sample plate that correspond to the selected areas.

In many embodiments, the GUI allows a user to view a sample plate image and superimpose editable shapes on the image. Computer programs for drawing shapes are well known in the art, e.g., Adobe Photoshop®, Adobe Illustrators, Macromedia Freehand®, and Corel Draw®, and the general concepts for drawing shapes (e.g., "mousing", "rubber-banding", tracing an object, etc.) may be adapted from these programs, and others, such as PaintShop PRO® from JASC (see www.jasc.com). In exemplary embodiments, the GUI application is written in JAVA 2D (see the world wide website of Sun Microsystems at java.sun.com/products/java-media/2D/). Such a tool allows the programmer to efficiently implement a 2D drawing program with mouse action. In another exemplary embodiments, C++ and the libraries from wxWindows (see the world wide web of wxWindows at wxWindows.org) are used. A user generally draws a shape corresponding to the perimeter of the sample plate, or the perimeter of the shape of a sample to be ionized, superimposed onto the image of the sample plate. For example, a user may "zoom in and out" of the image, and navigate around the image to view an image of a sample in detail. A sample for ionization may be parameterized by drawing its perimeter, or drawing a shape interior to its perimeter using the GUI. In most embodiments, selection of a sample for ionization involves a placing a cursor over the sample area using a device that controls movement of the cursor, e.g., a mouse, and indicating that that the curser is over a suitable sample, e.g., by clicking a button on the mouse, pressing a "return" button, or the like. In some embodiments, the cursor may be used to draw a shape, e.g., a circle, square, polygon, freehand shape etc. Once drawn, the shape may be further positioned and edited such that it corresponds in size, shape and position to a sample for ionization.

After the coordinates of a sample plate and at least one sample have been determined, the coordinates of the sample are used to create a sample plate layout parameter file, which is stored on computer readable media.

In exemplary embodiments, a sample plate is retrieved from a sample storage area using a robot arm, and placed in a sample plate viewing area, that, in some embodiments, is integrated with a MALDI system, where the sample plate parameters are determined programmatically, and a file containing the parameters is created and saved. Alternatively, an image of a sample plate containing samples to be ionized is selected and opened to become viewable on a computer monitor. A user, using a mouse and keyboard, clicks on the corners of the plate to define the sample plate geometry parameters. A user may navigate to a sample on the sample plate image, and zoom in. Once a sample is viewed at a suitable magnification, a sample area is selected by moving a cursor over the sample image at a position corresponding to the sample. The sample may be selected by, for example, clicking a mouse button or pressing a button on the keyboard or screen to alter the cursor into a shape drawing cursor and drawing a "freehand" outline of the sample, or a circle, square, rectangle, etc., which can be suitably moved, and edited until a superimposed shape corresponding to the sample perimeter has been drawn. These sample perimeters delineate the samples for ionization and indicate the size, shape and position of the samples on a plate. A plurality of samples may be outlined in such a manner, and the outlines may be converted into a sample plate parameter set for the sample plate. Once the sample plate parameters are determined, a file containing the parameters is created and stored.

In certain embodiments, sample plate parameter files may be produced utilizing the coordinates used by a device that placed the samples on the sample plate. For example, if samples were deposited onto the surface of a sample plate using a device for depositing samples, such as a spotting device or any other device that can deposit a sample on a sample plate, coordinates used for depositing a sample on the plate may be used as a sample plate parameter. In certain embodiments, therefore, a sample plate parameter may be derived from the coordinates used by a sample depositing device. In one embodiment, the sample depositing device is a liquid chromatography device, and the sample is deposited as a trace on the surface of a suitable sample plate.

In certain embodiments, sample plate parameters may use information that is manually extracted from the digital image of a sample plate. In certain embodiments, a user may instruct a digital camera that, in some embodiments, may be associated with a MALDI system, to digitally photograph a sample plate so that the sample plate can be parameterized using a GUI, as described above.

In many embodiments, a file of sample plate parameters may be saved in a sample plate parameter set library, such that it may be retrieved and used at a later time or date. As mentioned above, sample plate parameter files in a library may be associated with a unique sample plate identifier that corresponds to an individual sample plate. By selecting or typing in a unique sample plate identifier, a set of sample plate parameters may be selected from a library of sample plate parameter sets.

As mentioned above, information stored in MALDI plate layout parameter files may be combined with other stored information regarding a sample or a sample plate to provide an improved method for positioning a sample with respect to a laser beam. In certain embodiments, however, the files may be used without any other information in order to position a sample on a MALDI sample plate in a laser beam to ionize the sample. Exemplary embodiments of the invention are provided below.

Methods for Positioning an Area on a Sample Plate in a Laser Beam

The invention provides methods of positioning a selected area, e.g., at least a portion of a sample, on a MALDI sample plate relative to a laser beam such that the area is positioned in the laser beam. In general, the methods involve placing a MALDI sample plate in a MALDI ion source, accessing a subject layout file for the sample plate, and moving the sample plate relative to the laser beam such that the selected area is positioned in the beam, according to the layout parameters stored in the subject layout file. In most embodiments, a MALDI sample plate for MALDI analysis is selected, and a subject layout file for the selected sample plate is accessed by a MALDI ion source. Using the parameters stored in the layout file, the application software of the MALDI ion source can, for example, control stepper motors or motor servers to place a selected position on the plate, usually corresponding to a sample, in the laser beam. The positioning of a sample in the laser beam is usually achieved by moving the sample plate or the laser beam (e.g., by moving the laser source, or changing the path of the laser beam using mirrors, lenses or other optical components) such that the sample is positioned in the laser beam.

Generally, the sample plate or laser beam is moved in X and Y (or other coordinate) directions corresponding to the planar surface of the sample plate. In certain embodiments, where information about the Z axis (e.g., the height of the sample in relation to a planar surface of a sample plate) is stored in the layout file, the focus of the laser beam may be adjusted such that the sample is present at the focal plane of the laser beam. Once positioned, the laser beam is usually fired to facilitate ionization of the sample.

In the subject methods, a layout file is usually chosen from a library of layout files e.g., from a database (e.g., a text document, a spreadsheet, a workbook etc), or a collection of text files (e.g., XML files, etc.). In certain embodiments, a file path is entered into a MALDI user interface to retrieve a file, or a file path may be selected manually or automatically. As discussed above, the layout file for a sample plate may be identified using a unique identifier that corresponds to a sample plate. The layout file may be retrieved by manually typing the number into a user MALDI user interface or automatically reading the number from a plate using a barcode reader, either an external barcode reader, or a barcode reader that is integral to the MALDI ion source. In many embodiments, once a suitable layout file is selected, the user may accept the layout file.

The methods described above may be used for consecutively positioning more than one arbitrary area on a sample plate, e.g., for consecutively positioning more than one arbitrary sample, or more than one arbitrary area within a sample, in a laser beam. For example, a user may arbitrarily select that more than one (e.g., 2 or more, about 3 or more, about 5 or more, about 8 or more, about 10 or more, about 15 or more, about 20 or more, about 25 or more, about 30 or more, about 50 or more, about 80 or more, about 100 or more, about 200 or more, about 500 or more, about 1000 or more, about 5000 or more, usually up to about 10,000) arbitrary areas of a sample plate (e.g., corresponding to samples or non-overlapping areas of a sample) for positioning. For example, a user may select that three independent samples, three areas of a circular sample, or 100 areas of a linear sample, such as that shown in FIG. 3A or FIG. 3B, for positioning. In these embodiments, a sample plate is moved relative to a laser beam such that a selected position of the sample plate is positioned in the laser beam according to the information stored in layout file for the sample plate. If another arbitrary area of the sample plate is to be positioned, the sample plate is then moved relative to a laser beam such that the second arbitrary position of the sample plate is positioned in the laser beam according to the information stored in the same layout file.

In certain embodiments, the area of a sample defined by a sample plate layout file may be significantly larger than the area of the laser beam. In such embodiments, a laser beam may be directed to at least one area of a sample that is randomly chosen, or at least one predetermined area within a sample, such as, for example, areas close to the center, close to an edge of the sample or at particular crystals in the sample.

The subject methods may be used in combination with other information to direct a laser beam to a particular position in a sample. As such, the subject methods may be used in a two-step method for directing a laser beam to a sample: the first step, described herein, creates a sample plate parameter file that provides the position, size and shape of a sample perimeter of sample on a sample plate, and the second step determines a particular position within the sample perimeter that is to be ionized. In other words, the subject methods may be used to create a file that defines the layout of a sample plate. This file may be used to direct a laser to a sample plate, or used in combination with other methods to direct a laser beam to a particular position within the sample.

In certain embodiments, not all samples of a sample plate are ionized. The selection of which samples to be ionized on a sample plate may be done using the GUI, or by other means, e.g., assessment of morphology, presence or absence of particular optical or spectroscopic properties.

Methods for Ionizing a Sample

The invention provides methods for operating a MALDI ion source. In general, the methods involve entering sample plate layout parameters into a computer readable file prior to installation of a MALDI sample plate in the MALDI ion source, positioning the sample plate using the sample plate parameters such that a sample on the plate is in a laser beam, and firing a laser beam at the sample to effect ionization of the sample.

The methods are useful for ionizing a plurality of arbitrarily positioned samples on a sample plate. In many embodiments, once a sample plate layout parameter file has been created and stored, a user may arbitrarily select a plurality of samples to be ionized, and the selected plurality of samples are consecutively ionized using the information provided in the stored sample plate layout parameter file.

The methods provide for automated ionization of a plurality of samples. In certain embodiments, a sample plate is chosen and a sample plate layout parameter file is produced and saved using an image analysis program, as described above. After the plate layout parameter file is saved, the plate is then loaded into a MALDI ion source, and a plurality of samples that may or may not be selected by a user, are ionized. Such automatic methods may be facilitated by a robotic arm that is integrated with the MALDI ion source, that may move a barcoded sample plate from a sample storage area to a sample plate viewing area where an image of the sample is generated and a plate layout file is created and saved, and then to a MALDI ion source where ionization occurs according to the information provided in the plate layout file.

In certain other embodiments, the methods may be used in protocols for ionizing samples from plates of differing formats using a single MALDI ion source. In these embodiments, a plurality of plates which already have corresponding plate layout files are stored in a storage area. The plates are transferred to a MALDI ion source and samples on the sample plate are ionized. Once selected samples have been ionized, the sample plate is transferred out of the MALDI ion source and the process is repeated with a different sample plate. In certain embodiments, where the plurality of plates do not have corresponding plate layout files, prior to their transfer to the MALDI ion source, a sample plate layout parameter file is made and stored for the plate.

To facilitate automated ionization, the MALDI ion source may be therefore integrated with a barcode reader and/or camera and/or digital image processor in order to facilitate the creation of sample plate layout files. These embodiments allow "hands-free" ionization of samples from a plurality of sample plates with different formats.

The subject methods find use in ionizing sample on any type of sample plate. In particular, the subject methods find use in ionizing sample on sample plates that have samples at known positions, e.g., "anchor" sample plates that have hydrophobic and/or hydrophilic coatings (see, e.g., U.S. Pat. No. 6,287,872), plates containing samples that are concentrated (e.g., samples that are at a concentration of 10 fM or higher), and plates containing samples that are smaller in size than the diameter of an ionizing laser beam. In certain embodiments where diameter of an ionization laser is smaller than the area containing a sample, a laser beam may be directed to the sample at a pre-determined position within the sample area, directed to a position within the sample area randomly, directed to a position within the sample chosen by a user (e.g., by eye) or pointed at a position within the sample area using other means, for example. In general, once sample plate parameters are determined, the number and direction of laser shots is usually determined using a method file. While the subject methods, alone, find use in directing a laser beam to a sample on a sample plate for ionization of the sample, the subject methods may also be combined with other methods in order to direct a laser beam to a particular position within a sample.

Figure 2:
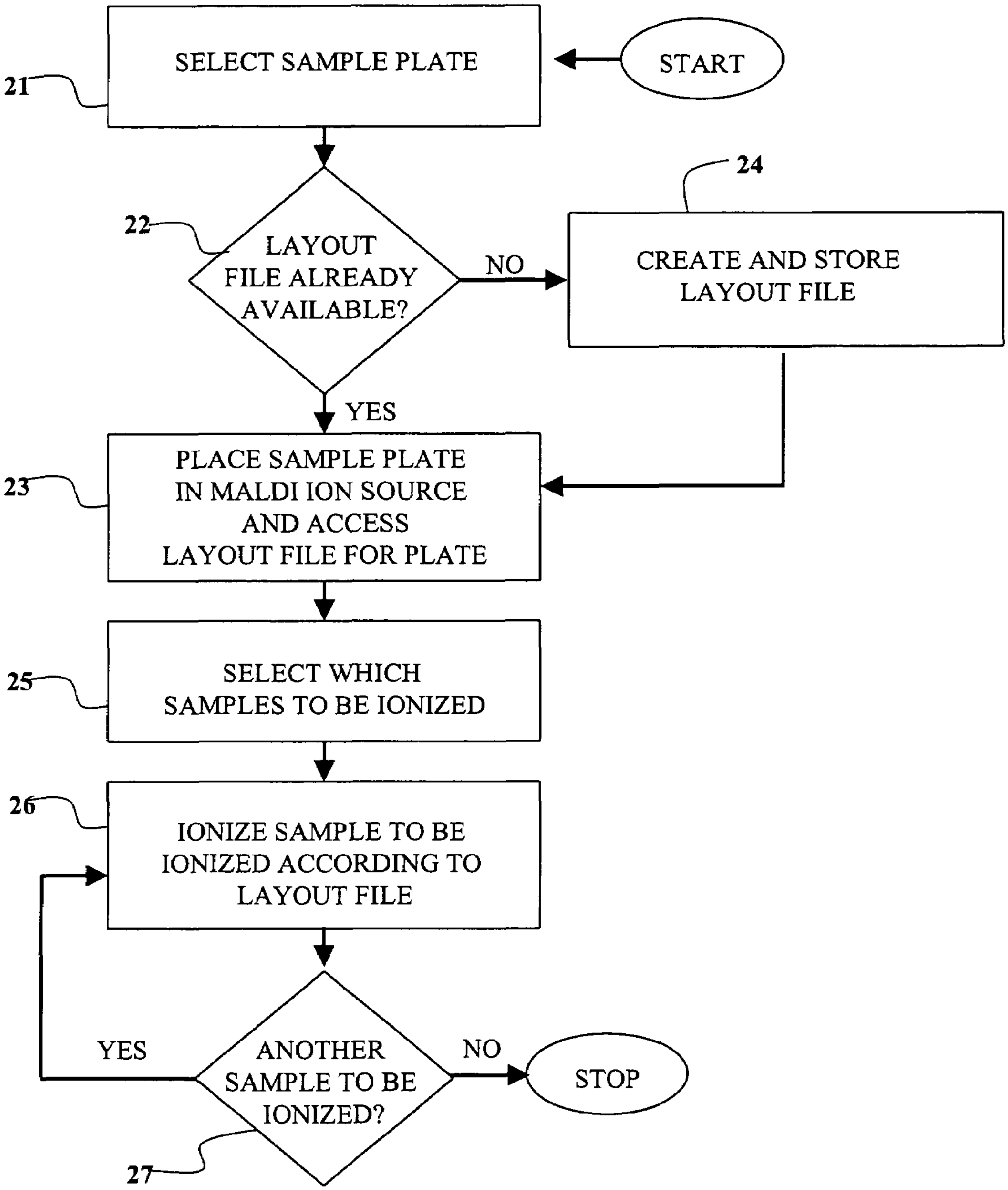
FIG. 2 is a flow chart showing an exemplary embodiment of the invention.

An exemplary embodiment of the invention is shown in the flow chart illustrated in FIG. 2. All steps of the method shown in FIG. 2 may be performed automatically, or manually, using the methodology outlined above. Sample selection 25 is usually optional, or may be performed at any time after sample plate selection and prior to ionization of a sample. Referring to FIG. 2, a sample plate is selected 21, and a unique identifier of the sample plate is used to query a computer readable medium to determine if a layout file is already available 22 for the sample plate. If a layout file for the sample plate is available the sample plate is placed in a MALDI source and the layout file for the file is accessed 23. If a layout file for the sample plate is not available, a layout file is created and stored 24 according to the methods described in detail above. Once a layout file is created and stored, the sample plate is placed in a MALDI source and the layout file for the file is accessed 23. Samples to be ionized may be selected 25 at this point, however, as mentioned above, this step may be done at a different time. After the layout file is accessed, a laser beam is positioned relative to a sample on the sample plate, and at least part of the sample is ionized according to the information provided in the layout file 26. After a sample is ionized, the system determines whether another sample on the sample plate is to be ionized 27. If another sample on the sample plate is to be ionized, the other sample is ionized according to the information provided in the layout file 26. If there is no other sample to be ionized, the method is terminated. Using the above methodology, a plurality of samples of a sample plate may be ionized, and, as one of skill in the art would recognize, when used in combination with robots and suitable barcode readers, the above methods could be used to ionize samples on a plurality of sample plates.

Computer-Readable Media

Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture that includes a recording of the present programming/algorithms for carrying out the above described methodology.

Suitable MALDI ion sources for ionizing a sample on a sample plate employing the above methods and computer readable media are described in the next section.

MALDI Ion Sources

Also provided by the subject invention are MALDI ion sources that are programmed to access MALDI sample plate layout files and position an area of a sample plate relative to a laser beam according to the information stored in the layout file. Representative MALDI ion sources include those described in U.S. Pat. Nos. 6,508,986; 6,423,966; 6,303,298; 6,287,872; 6,265,715; 6,175,112; 6,111,251; 5,886,345; 5,869,830; 5,854,486; 5,808,300; 5,777,324; 5,770,272; 5,716,825; RE37,485; 5,498,545; 6,027,942; 5,861,623; 5,821,063; 5,808,300; 5,969,350; 6,488,065; 6,353,423; 6,221,626; 5,827,659 and 5,860,240 and 5,705,813—the disclosures of which are herein incorporated by reference.

Several commercially available MALDI ion sources may be adapted or modified to perform the subject methods. Examples of those apparatuses are included in the following products: DYNAMO® (BioMolecular Instruments), REFLEX III®, BIFLEX III® and PROFLEX III® (Bruker Daltonics, Santa Fe, N. Mex.), PROTEINCHIP READER® (Ciphergen BioSystems, Fremont, Calif.), models RTOF260 and LTOF 160 (Comstock, Oak Ridge, Tenn.), GSG FUTURE (GSG Analytical Instruments, Germany), model R-500 TOFMS (Kore Technology, Ely, UK), KOMPACT DISCOVERY®, KOMPACT SEQ®, KOMPACT ALPHA® AND KOMPACT PROBE® (Kratos Technology, Manchester UK), models TOFSPEC-2E (Micromass, Cary, N.C.), and VOYAGER DE®, VOYAGER DET PRO®, VOYAGER DE STR®, PROTEOMICS SOLUTION 1® (PE Biosystems, Foster City, Calif.) and the Agilent (Palo Alto, Calif.) G1972A AP-MALDI source coupled to Agilent G240DA LC/MSD Ion Trap mass spectrometer.

In addition to the programming as described above, MALDI ion sources for performing the subject methods may have means for holding sample plates of differing shapes or sizes. In one embodiment, an adjustable clip on a sample plate platform may engage a sample plate and hold it a certain position in the MALDI ion source during ionization. Suitable sample plate clips may be adapted from microscopy arts, and may involve at least one clip that is spring loaded and that engages at least one part of the sample plate.

A suitable sample plate clip shown in FIG. 4A, which shows a sample plate platform 5 containing a raised sample plate stop 1 and two spring loaded sample clips 2. The springs force the clips in the direction of the arrows. FIGS. 4B and 4C show circular and rectangular sample plates being held in position against the sample plate stop 1, respectively. Suitable sample plate clips may also be identified in U.S. Pat. No. 4,620,776.

One of skill in the art would recognize that several other means could be used to secure a sample plate in a MALDI ion source, including magnets, positive or negative air pressure, adjustable screws, locking nuts, and the like.

In one embodiment, a MALDI ion source is integrated with a device such as a robot that may remove a sample plate from a subject MALDI ion source and/or transfer a sample plate from a sample plate storage facility into the MALDI ion source. In certain embodiments, a barcode reader may be integrated into the MALDI ion source, and the barcode reader may read a barcode associated with the sample plate in order to identify a file that provides sample plate parameters from a sample plate parameter file library. In order to facilitate the transfer of sample plates, the sample plates may be held in a suitable sample plate platform while in the sample plate storage facility, and, as such, a robot may remove and add platforms containing sample plates to the MALDI ion source.

The MALDI ion source may, in some embodiments, be integrated with a MALDI sample plate viewing area where a MALDI sample plate may be transferred, and an image of the plate generated in order to facilitate the creation and storage of a plate layout file, as discussed above.

Kits

Kits for use in connection with the subject invention may also be provided. Such kits include at least a computer readable medium including programming for creating and storing a MALDI sample plate layout parameter file, as discussed above and/or instructions for operating a MALDI ion source according to the stored file. The instructions may include installation or setup directions. The instructions may include directions for use of the invention with options or combinations of options as described above. In certain embodiments, the instructions include both types of information. In addition to the programming and instructions, the kits may also include a library of different plate layout parameter files (e.g., more than 2, more than about 5, more than about 10, more than about 50, more than about 100, more than about 500, more than about 1000, usually up to about 10,000 plate parameter sets), and one or more reference sample plates, e.g., two or more reference sample plates of differing sample plate format for use in testing a MALDI ion source after software installation.

Providing the software and instructions as a kit may serve a number of purposes. The combination may be packaged and purchased as a means of upgrading an existing scanner. Alternately, the combination may be provided in connection with a new scanner in which the software is preloaded on the same. In which case, the instructions will serve as a reference manual (or a part thereof) and the computer readable medium as a backup copy to the preloaded utility.

The instructions are generally recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or subpackaging), etc. In other embodiments, the instructions are present as an electronic storage data file present on a suitable computer readable storage medium, e.g., CD-ROM, diskette, etc, including the same medium on which the program is presented.

In yet other embodiments, the instructions are not themselves present in the kit, but means for obtaining the instructions from a remote source, e.g., via the Internet, are provided. An example of this embodiment is a kit that includes a web address where the instructions can be viewed and/or from which the instructions can be downloaded. Conversely, means may be provided for obtaining the subject programming from a remote source, such as by providing a web address. Still further, the kit may be one in which both the instructions and software are obtained or downloaded from a remote source, as in the Internet or world wide web. Some form of access security or identification protocol may be used to limit access to those entitled to use the subject invention. As with the instructions, the means for obtaining the instructions and/or programming is generally recorded on a suitable recording medium.

Systems

Also provided by the subject invention are systems for use in practicing the subject methods. The subject systems include a MALDI ion source for performing the methods as described above. In certain embodiments, the subject systems may further include reagents employed in analyte mass determination protocols, a mass spectrometer TOF-MS, a robot for transferring sample plates, a MALDI plate viewing area, a barcode reader, a digital camera, a digital image processor, a computer system for controlling and/or monitoring the subject MALDI system, and a computer system for analyzing data produced by the ion detector.

In certain embodiments, the system is a system for positioning a MALDI sample plate in a MALDI ion source. In general, the system comprises a) a computer readable file having stored sample plate layout parameters, the file being stored in a computer readable medium prior to placement of the MALDI sample plate in the MALDI ion source; and b) means for positioning the MALDI sample plate using information in said computer readable file after placement of the MALDI sample plate in the MALDI ion source.

Utility

The subject methods and apparatus find use in a of variety applications, where such applications are generally analyte abundance determination applications in which the presence and abundance of at least one particular analyte in a sample is determined. Protocols for carrying out MALDI assays are well known to those of skill in the art and need not be described in great detail here. Generally, samples to be investigated are prepared and placed on a sample plate. A laser beam is focused on the sample, the energy of the laser beam causes a plume of matrix fragments and ions to form from the sample, and ions from the plume are introduced into a detector, usually a mass spectrometer, for ion identification and measurement.

The subject methods find exemplary utility in, for example, making measurements of analytes that are present on sample plates of different sizes, shapes, and formats.

The subject methods find particular use with MALDI protocols. MALDI protocols employed with the subject methods may vary in detail depending on the analyte to be analyzed, the particular MALDI protocol employed, etc., where MALDI protocols include, but are not limited to, AP-MALDI and vacuum MALDI protocols. However, common to all MALDI protocols is the preparation of a mixture that includes the analyte of interest and a matrix.

A matrix is typically a small organic, volatile compound with certain properties that facilitate the performance of MALDI, e.g., the light absorption spectrum of the matrix crystals overlaps the frequency of the laser pulse being used, the intrinsic reactivity of the matrix material with the analyte must be suitable, the matrix material must demonstrate adequate photostability in the presence of the laser pulse, the volatility and affinity for the analyte must be suitable, etc. Accordingly, a matrix is selected based on a variety of factors such as the analyte of interest (type, size, etc.), etc. Examples of matrices include, but are not limited to, sinapinic acid (SA); alpha-cyano-4-hydroxycinnamic acid (HCCA); 2,5-dihydroxybenzoic acid (DHB); 3-hydroxypicolinic acid (HPA); 2',4',6'-trihydroxyacetophenone; and dithranol. The matrix is typically dissolved in a suitable solvent that is selected, at least in part, so that it is miscible with the analyte solvent. For example, in the analysis of peptides/proteins HCCA and SA work best with ACN/0.1% TFA as solvent and in the analysis of oligonucleotides HPA and ACN/$H_2O$ may be employed.

Accordingly, after the appropriate matrix is selected, the analytes are thoroughly mixed or suspended in the matrix at a suitable ratio to provide a sample that includes the analyte matrix mixture. In many embodiments, saturated solutions of the matrix are thoroughly mixed with dilute solutions (e.g., nmole/μL to fmole/μL) of the analyte in a suitable ratio. In certain embodiments, for example when the analyte is a protein, higher concentrations may be required (e.g., 0.1 mmole/μL to about 1 mmol/μL). The exact ratio of the matrix to sample will vary, but typically ranges from about 1:1 to about 20:1 or more, usually in the range of about 1:1 to about 10:1. In certain embodiments, co-matrices or matrix additives may be added to the mixture to enhance the quality of the MALDI process, e.g., by increasing ion yields; decreasing and/or increasing fragmentation; increasing the homogeneity of the matrix/analyte; decreasing cationization; increasing sample-to-sample reproducibility; etc. The amount of analyte fragment/matrix mixture present in each fluid retaining structure may vary depending on the type of particular analyte, the particular MALDI protocol employed, etc. Typically, about 0.1 μL to about 10 μL or more of the analyte fragment/matrix mixture is present in each fluid retaining structure, in certain embodiments from about 0.1 μL to about 5 μL and in certain embodiments from about 0.1 μL to about 2 μL of the analyte fragment/matrix mixture is present in each fluid retaining structure. In certain embodiments, calibration standards may be added to one or more fluid retaining structures, e.g., to dynamically calibrate a MALDI associated device such as a mass spectrometer, and/or controls such as positive and/or negative controls may also be employed.

Next, the analyte matrix mixture may be dried resulting in a solid deposit of analyte-doped matrix crystals in a sample plate or the mixture may be maintained in fluid form on the sample plate such that desorption from aqueous solutions may be employed (see for example Laiko et al. describing such using an IR laser in [J. of the American Society for Mass Spectrometry, published online Feb. 14, 2002]). In a drying protocol, the matrix molecules precipitate out of solution resulting matrix crystals. Drying may be accomplished using any convenient method such as air drying (i.e., room temperature drying), vacuum drying, etc.

In general, in the performance of MALDI, laser energy is directed to the one or more analyte matrix mixtures retained in a sample plate. Nitrogen lasers operating at 337 nm are the most common illumination sources, as such radiation from lasers is usually well absorbed by many matrices. However, other lasers may also be employed, e.g., other UV and IR lasers. Upon laser irradiation, the matrix and analyte molecules are desorbed and ionized. Either transmission or reflection geometry may be employed in accordance with the subject methods. In reflection geometry, typically a laser illuminates the sample or analyte on the front side of the substrate such that laser illumination takes place on the same side of the substrate as ion extraction, e.g., the front of an opaque substrate surface. In transmission geometry, laser illumination is accomplished through the back side of the substrate, i.e., illuminating a sample from behind (see for example Galicia et al., Analytical Chemistry, vol. 74, 1891-1895 (2002)). The use of transmission geometry enables the use of samples such as tissues and cells.

Once desorbed and ionized, the ions may be analyzed. As described above, a variety of analysis apparatus and methods for analyzing MALDI-generated ions are known in the art and may be employed in accordance with the subject invention. In certain embodiments, the subject methods include analyzing the ions provided by the above-described MALDI protocol using a mass spectrometer. In further describing the subject invention, time-of-flight mass spectrometer ("TOF-MS") and ion trap mass spectrometers are used for exemplary purposes only and are in no way intended to limit the scope of the subject invention.

Accordingly, in certain embodiments, a TOF-MS (or an ion trap mass spectrometer or the like) is operatively coupled to the MALDI ion source used to ionize the analyte. Once ionized, the ions are electrostatically accelerated and transferred to a flight-tube that is free of electrostatic fields. Ions are separated from each other in the flight tube based on their mass-to-charge (m/z) ratios. A detector detects the ions and records the time it takes for each ion to arrive at the detector (at the end of the flight tube) as well as the signal intensity of each species of ion, such that lighter ions exit the flight tube first, followed by the heavier ions in increasing order of mass-to-charge ratio (i.e., ions with a larger mass travel at a slower velocity and therefore arrive at the detector after smaller mass ions). In this manner, a mass spectrum may be provided that yields information about the ions such as concentration and structural information.

In certain embodiments, the subject methods include a step of transmitting data, e.g., mass spectrum data, from the above-described methods to a data processor which may, in some embodiments, be at a remote location.

The following examples are offered by way of illustration and not by any way of limitation.

EXPERIMENTAL

The following examples are put forth so as to provide those of ordinary skill in the art with a description of how to make and use some embodiments of the present invention, and are not intended to limit the scope of what the inventors regard as their invention.

Example 1

Plate Geometry Configuration (PGC) Files

Besides defining individual methods for ionization (e.g., the pattern of laser shooting or the number of laser shots) for each sample feature (e.g., a spot) of a MALDI plate, the user can also define a layout for each individual plate. A file could define/specify such a layout (called a plate-geometry-configuration file, or PGC file). Such a file could also be created/edited or viewed by a software component with a graphical user interface which would allow the user to define/edit the layout through dragging/moving a pointing device (e.g., a mouse pointer) following the concepts for a drawing program. Such PGC files may not be human readable. For example, a user may draw a picture of a sample MALDI plate which is converted into a PGC file using the system, or a user may enter numerical coordinates corresponding to the configuration of a sample plate. A library with predefined PGC files for standard plate configurations may be provided. Such a library would allow a user to edit pre-existing PGC files and adjust them for different plate geometries and different sample feature locations.

The following is an exemplary tagged ASCII-file (similar to XML) implementation for a PGC-file, which may be generated programmatically and may be human readable. In this example, the PGC file describes the position of three samples on a sample plate, using "X" and "Y" coordinates. The first and third sample feature are spots that are circular in shape. The second sample feature is rectangular. Rectangular sample feature geometries are possible when using plates with rectangular depressions or rectangular shaped "anchor" plates that have hydrophobic and hydrophilic coatings (see U.S. Pat. No. 6,287,872).

```
<MALDI_PLATE_DEFINITION>
<MALDI_PLATE_TITLE>PGC-file for AP MALDI plate 02-23-1233</MALDI_PLATE_TITLE>
<MALDI_PLATE_AUTHOR>Name of Author</MALDI_PLATE_AUTHOR>
<MALDI_PLATE_DATE>01-01-2002</MALDI_PLATE_DATE>
<MALDI_PLATE_UNITS>mm</MALDI_PLATE_UNITS>
<MALDI_PLATE_PLATE_LENGTH>20.0</MALDI_PLATE_PLATE_LENGTH>
<MALDI_PLATE_PLATE_HEIGHT>35.0</MALDI_PLATE_PLATE_HEIGHT>
<MALDI_PLATE_NUM_SPOTS_PER_PLATE>3</MALDI_PLATE_NUM_SPOTS_PER_PLATE>
<MALDI_PLATE_SEQUENCE>standard sequence</MALDI_PLATE_SEQUENCE>
<MALDI_PLATE_SPOT_PARAM>
    <MALDI_PLATE_SPOT>
        <MALDI_SPOT_SPOTID>1</MALDI_SPOT_SPOTID>
        <MALDI_SPOT_XPOS>5.2</MALDI_SPOT_XPOS>
        <MALDI_SPOT_YPOS>1.3</MALDI_SPOT_YPOS>
        <MALDI_SPOT_GEOMETRY>circle</MALDI_SPOT_GEOMETRY>
        <MALDI_SPOT_RADIUS>2.7</MALDI_SPOT_RADIUS>
        <MALDI_SPOT_METHOD>standard01</MALDI_SPOT_METHOD>
        <MALDI_SPOT_COMMENT>this spot is from 123-3434</MALDI_SPOT_COMMENT>
    </MALDI_PLATE_SPOT>
    <MALDI_PLATE_SPOT>
        <MALDI_SPOT_SPOTID>2</MALDI_SPOT_SPOTID>
        <MALDI_SPOT_XPOS>10.2</MALDI_SPOT_XPOS>
        <MALDI_SPOT_YPOS>1.3</MALDI_SPOT_YPOS>
        <MALDI_SPOT_GEOMETRY>rectangular</MALDI_SPOT_GEOMETRY>
        <MALDI_SPOT_RECTX>0.5</MALDI_SPOT_RECTX>
        <MALDI_SPOT_RECTY>0.7</MALDI_SPOT_RECTY>
        <MALDI_SPOT_METHOD>standard02</MALDI_SPOT_METHOD>
    </MALDI_PLATE_SPOT>
    <MALDI_PLATE_SPOT>
        <MALDI_SPOT_SPOTID>3</MALDI_SPOT_SPOTID>
        <MALDI_SPOT_XPOS>15.2</MALDI_SPOT_XPOS>
        <MALDI_SPOT_YPOS>1.3</MALDI_SPOT_YPOS>
        <MALDI_SPOT_GEOMETRY>circle</MALDI_SPOT_GEOMETRY>
        <MALDI_SPOT_RADIUS>0.7</MALDI_SPOT_RADIUS>
        <MALDI_SPOT_METHOD>standard01</MALDI_SPOT_METHOD>
    </MALDI_PLATE_SPOT>
    </MALDI_PLATE_SPOT_PARAM>
</MALDI_PLATE_DEFINITION>
```

Different geometries of sample feature (i.e. the information stored between the tag called <MALDI_SPOT_GEOMETRY> in this example) may be caused by different shapes of indentations e.g. wells, of the plate at various locations. When a liquid is injected into such a well, by hand or by an automated system, the crystal distribution would try to match the geometry of the hole. In many embodiments, no indentations or circular indentations are used, and the invention is not limited to circular spots.

The following shows an exemplary tagged ASCII-file (similar to XML) implementation for a PGC-file for a circular plate, which might be generated programmatically but is still human readable. This example uses polar coordinates. In this example, all sample features (i.e. samples) are circular in shape.

PGC files can be provided, for example, by user input via a) a graphical user interface, b) user input via directly editing a human readable file, c) a computer system via digital image processing, and d) a computer system via a library based PGC file that is selected based on a unique identifier, e.g. a barcode that is read by a barcode reader, or other system input coming from other components (such as a spotter, plate-loader, etc.).

Example 2

Mass Determination of Linear Traces

In some examples, sample features are rectangular or circular. In other examples the samples are elongated sample feature (or traces) that are deposited on an AP MALDI and/or

```
<MALDI_PLATE_DEFINITION>
<MALDI_PLATE_TITLE>PGC-file for AP MALDI plate 02-23-1233</MALDI_PLATE_TITLE>
<MALDI_PLATE_AUTHOR>Name of Author</MALDI_PLATE_AUTHOR>
<MALDI_PLATE_DATE>01-01-2002</MALDI_PLATE_DATE>
<MALDI_PLATE_UNITS>mm</MALDI_PLATE_UNITS>
<MALDI_PLATE_SHAPE>nonrectangular</MALDI_PLATE_SHAPE>
<MALDI_PLATE_SHAPE>circular</MALDI_PLATE_SHAPE>
<MALDI_PLATE_PLATE_RADIUS>4.0</MALDI_PLATE_PLATE_RADIUS>
<MALDI_PLATE_NUM_SPOTS_PER_PLATE>2</MALDI_PLATE_NUM_SPOTS_PER_PLATE>
<MALDI_PLATE_SEQUENCE>standard sequence</MALDI_PLATE_SEQUENCE>
<MALDI_PLATE_SPOT_PARAM>
    <MALDI_PLATE_SPOT>
        <MALDI_SPOT_SPOTID>1</MALDI_SPOT_SPOTID>
        <MALDI_SPOT_RPOS>0.2</MALDI_SPOT_RPOS>
        <MALDI_SPOT_PHIPOS>60.0</MALDI_SPOT_PHIPOS>
        <MALDI_SPOT_GEOMETRY>circle</MALDI_SPOT_GEOMETRY>
        <MALDI_SPOT_RADIUS>0.2</MALDI_SPOT_RADIUS>
        <MALDI_SPOT_METHOD>standard01</MALDI_SPOT_METHOD>
        <MALDI_SPOT_COMMENT>this spot is from 123-3434</MALDI_SPOT_COMMENT>
    </MALDI_PLATE_SPOT>
    <MALDI_PLATE_SPOT>
        <MALDI_SPOT_SPOTID>2</MALDI_SPOT_SPOTID>
        <MALDI_SPOT_RPOS>0.8</MALDI_SPOT_RPOS>
        <MALDI_SPOT_PHIPOS>60.0</MALDI_SPOT_PHIPOS>
        <MALDI_SPOT_GEOMETRY>circle</MALDI_SPOT_GEOMETRY>
        <MALDI_SPOT_RADIUS>0.2</MALDI_SPOT_RADIUS>
        <MALDI_SPOT_METHOD>standard01</MALDI_SPOT_METHOD>
        <MALDI_SPOT_COMMENT>this spot is from 123-3434</MALDI_SPOT_COMMENT>
    </MALDI_PLATE_SPOT>
</MALDI_PLATE_SPOT_PARAM>
</MALDI_PLATE_DEFINITION>
```

<MALDI_SPOT_RPOS> and <MALDI_SPOT_PHIPOS> are the radial and angular positions on a circular disk (polar coordinates) with its center at $r=0$ and $\phi=0$. In the case of an elliptical shape, one would enter the coordinates of sample feature in elliptical coordinates. For irregular shaped plates, one would, for example, interpolate the outer edges of the plate by polynomial functions of sufficient degree and use rectangular coordinates for spot locations on such an irregular plate.

The outline of a sample trace may be provided as a list of polygons that form the outside boundary of the entire trace.

To support sample plates of various geometries and sizes a MALDI ion source may also require a flexible MALDI plate holder. Such plate holders are already available for microscope slides used for compound light microscopy applications. A similar concept that registers certain features of a given plate, such as the upper-left corner of a rectangular plate or two orthogonal tangents to a circle of a circular plate, will allow an automated system to access all spots on a plate that are defined in a PGC file for the plate.

MALDI plate. This may be done by connecting the outlet of an liquid chromatography (LC) column using a dropping head positioned above a MALDI plate. The sample will continuously flow out of the LC column to continuously deposit a sample together with matrix dilution onto a plate, which is moved in such a way that the sample/matrix mixture forms an elongated sample feature or trace on the plate (e.g. see FIGS. 3A and 3B). The user may define the geometry for this case. For example, the system can take a digital image of the plate prior to processing, determine the outer edges of the traces, and allow the user to modify the information graphically using a suitable GUI. The digital image can then be used to create a PGC file.

Once a PGC file for such a sample plate is established, several areas within the trace may be subjected to ionization. In many embodiments, areas at various positions in the trace of the sample are ionized (e.g., the areas separated by e.g. 1 mm, 2 mm, 5 mm etc.) such that representative samples may be taken for the entire length of the trace.

Example 3

Mass Determination of Electrophoresed Samples

Samples of interest may be electrophoresed (1D or 2D) and transferred via e.g. vacuum or electrophoretic blotting, either directly or indirectly to a suitable MALDI sample plate and mixed with matrix such that the sample is a suitable substrate for MALDI. Alternatively a sample may be electrophoresed (1D or 2D) using a compound, usually a polymeric compound, that is a) suitable for electrophoresis, b) crystalizable when its temperature is lowered and/or light (e.g. UV light) of a suitable wavelength is applied, and c) that can act as a suitable matrix for AP MALDI and/or MALDI.

Electrophoretically separated samples may be ionized and/or analyzed by an AP MALDI and/or MALDI system for MS and/or MS/MS analysis. In this case, the sample feature geometry, which is most likely not circular, can be captured by image processing technology and/or the user is able to define the sample (e.g. a band or spot) size, location and geometry. A MALDI laser then is directed towards those samples.

Example 4

Graphical User Interface

Figure 5:
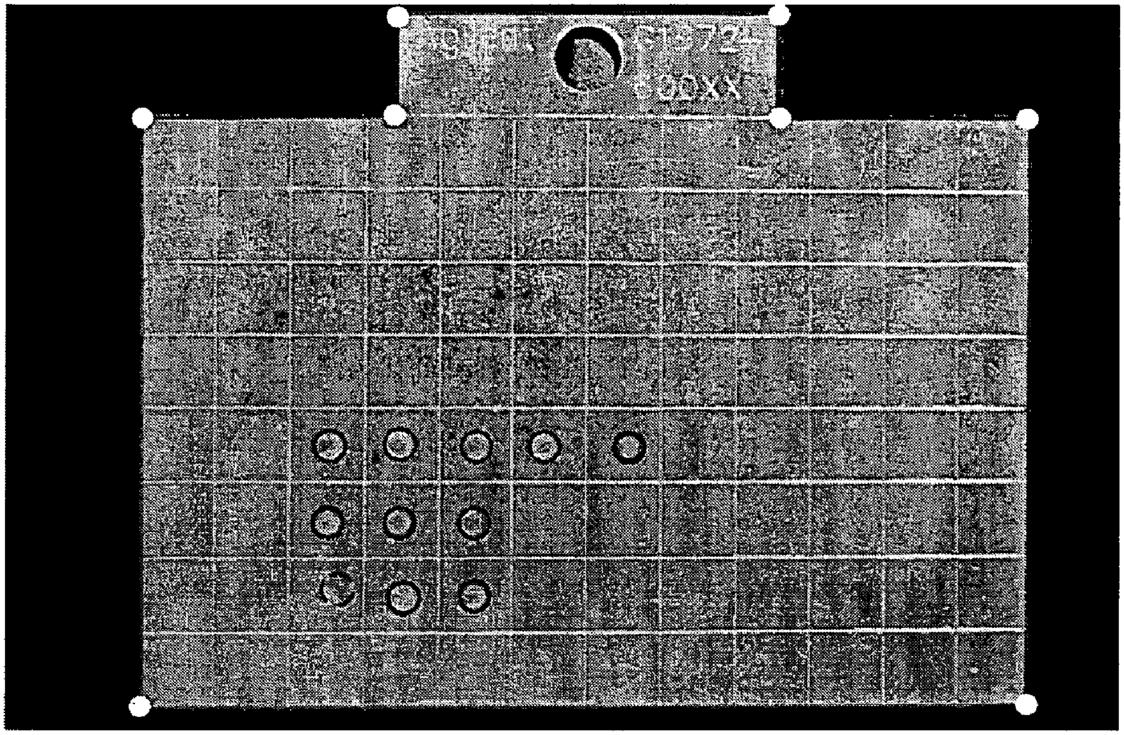
FIG. 5 is an exemplary image of a sample plate, as viewed through a graphical user interface for creating a MALDI sample plate layout file. The perimeter of the sample plate, shown on a black background, is demarcated using white spots placed by a cursor. The perimeters of samples is also marked using black circles that are also placed using a cursor. A sample perimeter that has been drawn and is in the process of being moved over a sample is shown using a broken line circle.

FIG. 5 shows an image of a sample plate, as it could be viewed through an graphical user interface for creating a MALDI sample plate layout files. The exemplary image shows a image of a MALDI plate in the process of being parameterized. The white dots are placed by the user to define the outer edges of the sample plate. The smaller black continuous line circles are placed over the samples by a user after selecting the circular shape feature for these spots. The dashed line circle has not yet been moved into the right position. Once the user accepts radius and position, the dashed line circle will change into a continuous line circle.

After the user is finished with entering the plate geometry, sample feature location and shape, the computer generates an XML-like file that represents the sample plate parameter set for this sample plate.

It is evident from the above results and discussion that the subject invention provides an important new means for scanning a substrate. Specifically, the subject invention provides a system for maintaining correct focus of a light source while scanning a biopolymeric array. As such, the subject methods and systems find use in a variety of different applications, including research, diagnostic and other applications. Accordingly, the present invention represents a significant contribution to the art.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method of positioning a sample on a MALDI sample plate in a laser beam, comprising:

a) storing a file comprising parameters that describe a perimeter of a sample on the MALDI sample plate;

b) placing said MALDI sample plate in a MALDI ion source;

c) accessing said stored file for said MALDI sample plate; and d) positioning the sample in relation to the laser beam such that the sample is in the laser beam using said parameters.

2. The method of claim 1 wherein positioning comprises moving the sample relative to the laser beam.

3. The method of claim 1 wherein positioning comprises moving the laser beam relative to the sample.

4. The method of claim 1 wherein said accessing comprises using a barcode associated with said MALDI sample plate.

5. The method of claim 1 further comprising ionizing a portion of said sample using said laser beam.

6. A method for positioning a MALDI sample plate in a MALDI ion source with respect to a laser beam, comprising:

(a) storing parameters that describe a perimeter of a sample on said sample plate in a computer readable file;

(b) placing said MALDI sample plate in the MALDI ion source; and (c) adjusting the relative position of the MALDI sample plate and the laser beam such that a selected position on said MALDI sample plate is impacted by the laser beam;

wherein said adjusting is done using the parameters of the computer readable file.

7. The method of claim 6 wherein said computer readable file is created at a work station that is remote to said MALDI ion source.

8. The method of claim 7 wherein said computer readable medium is accessible by said MALDI ion source.

9. The method of claim 6 wherein adjusting comprises moving the MALDI sample plate using the parameters and maintaining the laser beam in a fixed position.

10. The method of claim 6 wherein adjusting comprises moving the laser beam using the parameters and maintaining the MALDI sample plate in a fixed position.

11. A method for operating a MALDI ion source, comprising:

(a) storing sample plate layout parameters that describes a perimeter of a sample on a MALDI sample plate into a computer readable file;

(b) placing said MALDI sample plate in the MALDI ion source (c) positioning the MALDI sample plate using the sample plate layout parameters; and (d) ionizing said sample on the MALDI sample plate with a laser beam.

12. The method of claim 11, wherein steps (a), (b) and (c) are automated.

13. The method of claim 11, wherein said information is stored in permanent memory.

14. A method of preparing a sample, comprising:

(a) depositing a sample on a MALDI sample plate;

(b) creating a file comprising parameters that describe a perimeter of said sample on said MALDI sample plate; and (c) storing the file on a computer readable medium wherein said creating and said storing are done prior to placement of said MALDI sample plate in said MALDI ion source.

15. The method of claim 14, wherein the sample is a sample trace.

16. The method of claim 15, wherein the sample trace is an irregular shape.

17. The method of claim 16, wherein the irregular shape is selected from liner, non-linear, and elongate.

* * * * *